United States Patent
Zhu et al.

(10) Patent No.: US 8,289,883 B2
(45) Date of Patent: Oct. 16, 2012

(54) HYBRID MULTICAST ROUTING PROTOCOL FOR WIRELESS MESH NETWORKS

(75) Inventors: Chunhui Zhu, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 615 days.

(21) Appl. No.: 12/337,568

(22) Filed: Dec. 17, 2008

(65) Prior Publication Data

US 2009/0161594 A1    Jun. 25, 2009

Related U.S. Application Data

(60) Provisional application No. 61/016,388, filed on Dec. 21, 2007.

(51) Int. Cl.
*H04L 12/56* (2006.01)
*H04H 12/18* (2008.01)
*H04H 20/71* (2008.01)

(52) U.S. Cl. ........ 370/255; 370/390; 370/312; 370/338; 370/432; 370/238

(58) Field of Classification Search .................. 370/312, 370/432, 254, 390, 328, 338, 238, 255, 401
See application file for complete search history.

(56) References Cited

U.S. PATENT DOCUMENTS

| | | | | |
|---|---|---|---|---|
| 7,130,672 B2* | 10/2006 | Pewzner et al. | ............... | 600/324 |
| 7,502,354 B1* | 3/2009 | Maufer | ......................... | 370/338 |
| 7,522,540 B1* | 4/2009 | Maufer | ......................... | 370/254 |
| 7,564,786 B2 | 7/2009 | Lim et al. | | |
| 7,564,817 B2* | 7/2009 | Abeta et al. | ..................... | 370/331 |
| 7,583,601 B2 | 9/2009 | Yasukawa et al. | | |
| 7,835,301 B1* | 11/2010 | Maufer | ......................... | 370/254 |
| 2001/0034793 A1* | 10/2001 | Madruga et al. | .............. | 709/238 |
| 2005/0180447 A1* | 8/2005 | Lim et al. | ....................... | 370/432 |
| 2006/0098607 A1* | 5/2006 | Zeng et al. | ..................... | 370/338 |
| 2007/0168555 A1* | 7/2007 | Dorenbosch | ................... | 709/245 |
| 2007/0177594 A1* | 8/2007 | Kompella | ....................... | 370/390 |
| 2007/0274268 A1* | 11/2007 | Axelsson et al. | ............. | 370/338 |

(Continued)

FOREIGN PATENT DOCUMENTS

KR    10-2000-0027471    5/2000

(Continued)

OTHER PUBLICATIONS

Royer, E. et al., "Multicast Ad hoc On-Demand Distance Vector (MAODV) Routing"—Internet Draft, Jul. 15, 2000, pp. 1-25, United States.

(Continued)

*Primary Examiner* — Kwang B Yao
*Assistant Examiner* — Candal Elpenord
(74) *Attorney, Agent, or Firm* — Kenneth L. Sherman, Esq.; Michael Zarrabian, Esq.; Sherman & Zarrabian LLP

(57) ABSTRACT

A method of multicast routing in a wireless mesh network is provided. One implementation involves maintaining a multicast logical tree having a structure establishing parent-child connectivity relationships between wireless station nodes, wherein each node has access to local connectivity information for its local nodes; and a wireless station node joining a multicast group in the network and becoming the group coordinator. Each multicast group member may join and leave the group at any time utilizing both tree structure and local link state information.

39 Claims, 8 Drawing Sheets

U.S. PATENT DOCUMENTS

| | | | |
|---|---|---|---|
| 2009/0046614 A1* | 2/2009 | Lewis et al. | 370/312 |
| 2009/0201844 A1* | 8/2009 | Bhatti et al. | 370/312 |
| 2009/0303902 A1* | 12/2009 | Liu et al. | 370/254 |

FOREIGN PATENT DOCUMENTS

| | | |
|---|---|---|
| KR | 10-2001-0008852 | 2/2001 |
| KR | 10-2001-0057770 | 7/2001 |

OTHER PUBLICATIONS 802.15 Working Group of the 802 Committee, "Draft Recommended Practice for Standard [FOR] Information Technology—Telecommunications and Information Exchange between Systems—Local and Metropolitan Area Networks—Specific Requirements—Part 15.5: Mesh Enhancements for IEEE 802.15 WPANs," IEEE P802.15.5™/D2, Dec. 2007, pp. 1-180, United States.

802.15 Working Group of the 802 Committee, "Draft Recommended Practice for Information Technology—Telecommunications and Information Exchange between Systems—Local and Metropolitan Area Networks—Specific Requirements—Part 15.5: Mesh Topology Capability in Wireless Personal Area Networks (WPANs)," IEEE P802.15.5™/D8, Dec. 2008, pp. 1-172, United States.

Zheng, J. et al., "IEEE 802.15.5 WPAN Mesh Networks," IEEE 802.15.5, IEEE 802.15-05-0256, May 2005, pp. 1-100, United States.

International Search Report and Written Opinion dated Jul. 30, 2009 for International Application No. PCT/KR2008/007584 from Korean Intellectual Property Office, pp. 1-10, Seo-gu, Daejeon, Republic of Korea.

International Preliminary Report on Patentability and Written Opinion dated Jul. 1, 2010 for International Application No. PCT/KR2008/007584 from Korean Intellectual Property Office, filed Dec. 22, 2008, pp. 1-5, Seo-gu, Daejeon, Republic of Korea.

* cited by examiner

HYBRID MULTICAST ROUTING PROTOCOL FOR WIRELESS MESH NETWORKS

RELATED APPLICATION

This application claims priority from U.S. Provisional Patent Application Ser. No. 61/016,388, filed on Dec. 21, 2007, incorporated herein by reference.

FIELD OF THE INVENTION

The present invention relates generally to wireless networks, and in particular to wireless mesh (ad hoc) networks.

BACKGROUND OF THE INVENTION

In a wireless mesh network, all wireless stations (nodes) in the mesh network are equal so far as data communication is concerned. Multicast technology used to deliver data among a group of nodes. Two existing multicast technologies for wireless ad hoc network (wireless mesh network) are Multicast operations in Ad hoc On-Demand Distance Vector (AODV) routing protocol (MAODV) and tree-based multicast algorithm included in an IEEE 802.15.5/D2 draft specification (IEEE P802.15.5/D2, "Draft Recommended Practice to STANDARD [FOR] Information Technology-Telecommunications and information exchange between systems-Local and Metropolitan Networks-Specific requirements-Part 15.5: Mesh Enhancements for IEEE 802.15 WPANs", Dec. 17, 2007).

The MAODV protocol is intended for use by mobile nodes (mobile wireless stations) in an ad hoc network. MAODV offers quick adaptation to dynamic link conditions, low processing and memory overhead, and low network utilization. It creates bi-directional shared multicast trees connecting multicast sources and receivers. These multicast trees are maintained as long as group members exist within the connected portion of the network. Each multicast group has a group leader whose responsibility is to maintain the group sequence number, used to ensure freshness of routing information.

Route Requests (RREQs), Route Replies (RREPs), Multicast Activations (MACTs) and Group Hellos (GRPHs), are message types utilized by the multicast operation AODV. RREQs and RREPs are handled as specified in the unicast AODV (RFC 3561), except for certain procedures specifically designed for multicast.

As long as the multicast group members remain connected (within a "multicast tree"), MAODV does not play any role. When a node either wishes to join a multicast group or find a route to a multicast group, the node uses a broadcast RREQ to discover a route to the multicast tree associated with that group. For join requests, a route is determined when the RREQ reaches a node that is already a member of the multicast tree, and the node's record of the multicast group sequence number is at least as great as that contained in the RREQ.

For non-join requests, any node with a current route to the multicast tree may respond to the RREQ. A current route is defined as an unexpired multicast route table entry whose associated sequence number for the multicast group is at least as great as that contained in the RREQ. The route to the multicast tree is made available by unicasting a RREP back to the source of the RREQ. Since each node receiving the request caches a route back to the source of the request, the RREP can be unicast back to the source from any node able to satisfy the request. Once the source node has waited the discovery period to receive RREPs, it selects the best route to the multicast tree and unicasts the next hop a MACT message along that route. This message activates the route.

Nodes monitor the link status of next hops on the multicast tree. When a link break on the multicast tree is detected, the tree branch should be immediately repaired through the use of the RREQ/RREP/MACT messages.

A multicast group leader is associated with each multicast group. The primary responsibility of this node is the initialization and maintenance of the group sequence number. A Group Hello message is periodically broadcast across the network by the multicast group leader. This message carries a multicast group and group sequence number and corresponding group leader IP address. This information is used for disseminating updated group sequence numbers throughout the multicast group and for repairing multicast trees after a previously disconnected portion of the network containing part of the multicast tree becomes reachable once again.

The tree-based multicast routing protocol in the said IEEE 802.15.5/D2 draft specification, utilizes a logical tree built by the unicast routing protocol of the standard. The logical tree is a shared tree rooted at the Mesh Coordinator (MC) of the mesh network. When the tree is built, the neighbor information (up to N-hops away) as well as its relationship (parent, child, or sibling) to a node is recorded in every node's neighbor list.

The goal of tree-based multicast routing is defined as finding a minimum sub-tree of the logical tree which covers all multicast members of a multicast group. Joining and leaving the multicast group is dynamic so the multicast tree is minimal at any time during the multicast session. Because of the use of the tree structure, all control messages are unicast and no multicast routing table is needed. In most cases, the MC is not bothered for transmitting control and data messages hence the congestion around MC and single-point-of-failure problem can be avoided or relieved.

Furthermore, multicast data frames do not need to be sent to the MC first for delivery. They can be propagated to all other members directly from the data sources to ensure simple and timely data delivery. Non-members can also send packets to members but not vice versa. The multicast routing protocol uses six command frames for multicast tree formation and membership management as:

---

Group - Join REQuest (G-JREQ)
Group - Join REPly (G-JREP)
Group - Leave REQuest (G-LREQ)
Group - Leave REPly (G-LREP)
Group - Coordinator UpDate (G-CUD)
Group - DISmiss (G-DIS)

---

BRIEF SUMMARY OF THE INVENTION

The present invention provides a method and system for multicast routing in a wireless mesh network. One embodiment involves maintaining a multicast logical tree having a structure establishing parent-child connectivity relationships between wireless station nodes, wherein each node has access to local connectivity information for its local nodes; and a wireless station node joining a multicast group in the network and becoming the group coordinator.

One or more other wireless station nodes may join the multicast group and become members, including performing multicast packet routing communications among the multicast group members based on the tree structure. The logical tree may span all nodes in the network providing a multicast tree for routing multicast packets, wherein data packets are routed to tree nodes via mesh link by only looking at the packet destination address. A neighbor list may be maintained for each node, the list containing multicast related information for member nodes of each multicast group said node participates in.

The multicasting routing process may further include providing multicast group membership updates using the neighbor list by exchanging messages among the member nodes of each multicast group. The process may further include a member node leaving a multicast group by broadcasting a message to its local nodes; and each local node in the multicast group receiving the message, updating its neighbor list to reflect that the local node can no longer reach remaining nodes in said multicast group through the leaving member node.

A multicast group may end when no members remain in the multicast group. The local connectivity information for a node may comprise local communication link state information for a number of hops in relation to the node in the network. Preferably, no control messages are broadcast. The multicasting routing process may further include maintaining an addressing scheme based on the logical tree structure for unicast routing, and one or more nodes propagating local connectivity information to neighboring nodes to enable local connectivity information routing, wherein said messages are exchanged for unicast routing when the network is initialized, such that each node exchanges connectivity information to its local nodes, each node generating a local connectivity information table therefrom. Said messages may be exchanged when the network is in operation after initialization, each node broadcasting a message locally when the node becomes a member, or router, of a multicast group, as well as when leaving a multicast group.

These and other features, aspects and advantages of the present invention will become understood with reference to the following description, appended claims and accompanying figures.

DETAILED DESCRIPTION OF THE INVENTION

Figure 1:
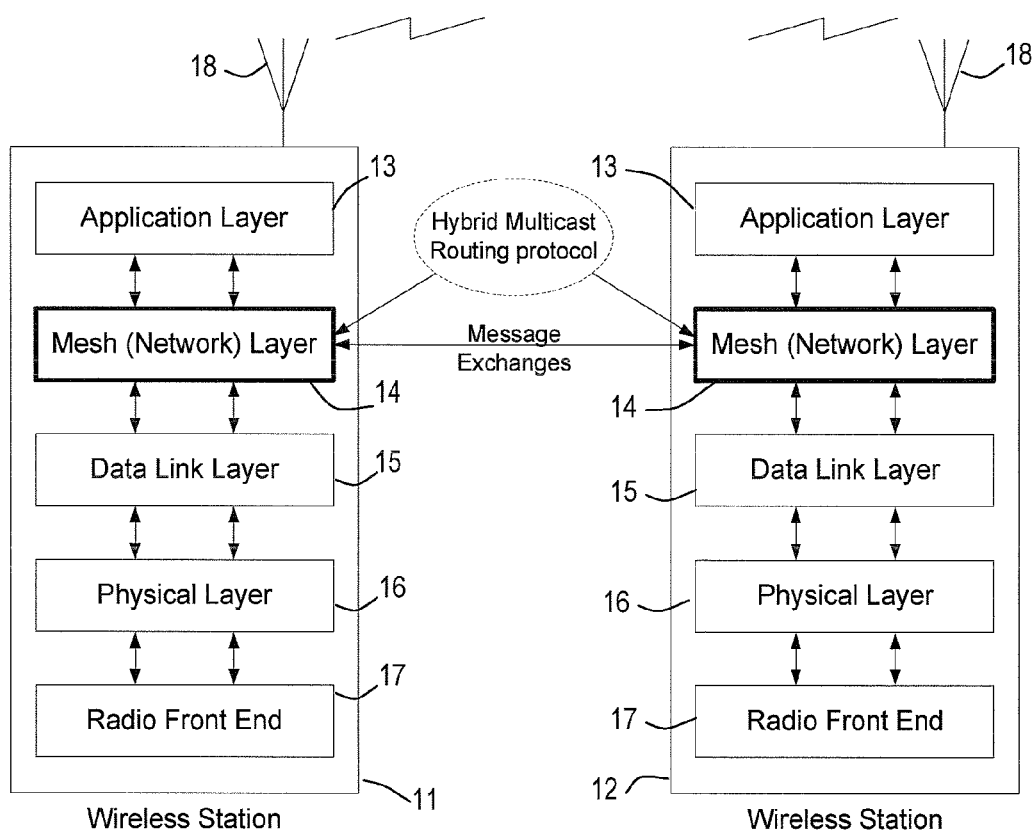
FIG. 1 shows a functional block diagram of a mesh network 10 including wireless stations 11, 12, implementing a hybrid multicast routing protocol, according to an embodiment of the invention.

The present invention provides a method and system for hybrid multicast routing protocol for wireless mesh networks. One embodiment involves a communication protocol that supports multicast communications in wireless low rate mesh networks. The hybrid multicast routing protocol relies on a pre-constructed logical tree that spans all nodes in the network and the availability of local link state information up to a specified number of hops for each node.

Said hybrid multicast routing protocol is useful with wireless mesh networks that are organized into logical trees with local link state information. As used herein, "hybrid" indicates the fact that the present invention seamlessly integrates the logical tree structure with local link state information. In one embodiment, such networks satisfy two conditions. First, a logical tree covers all the nodes in the network (the addressing scheme and the tree structure provide a basic way for unicast routing). Second, each node in the network should have the local connectivity information (i.e., link state information) up to N hops (e.g., N may be 2 or 3).

Such a multicasting protocol according to the invention utilizes logical tree and local link state information for a multicast protocol with low overhead. For example, no control messages need to be broadcast, thereby reducing number of collisions, improving packet delivery ratio and lowering energy consumption.

In a logical multicast tree for a wireless mesh network including multiple nodes (wireless stations), each node has exactly one parent node (except the root of the tree, which has no parent node) and one or more child nodes (except leaf nodes which have no child nodes). Wireless communication links connecting a node to its parent node or its child nodes are called tree links. Wireless communication links connecting a node to its neighbor nodes other than parent and child nodes are called mesh links. The logical tree routes data packets to nodes by only looking at the destination address. Examples of these types of logical trees include binary tree, Cluster Tree in ZigBee standard, and the tree structure based on block addressing method adopted by the IEEE 802.15.5/D2 low rate wireless personal area network (WPAN) mesh standard.

When said number of specified hops in the logical tree is the number of time-to-live of Hello (TTLOfHello), then the node collects local link state information from its neighbor nodes up to TTLOfHello hops, providing mesh links to all its neighbors up to TTLOfHello hops. In many cases, mesh links are able to provide shorter routes compared to tree links. The hybrid multicast routing protocol according to the invention utilizes mesh links whenever they are available in order to construct an efficient multicast tree for routing multicast packets. In this description "routing" and "forwarding" of packets are used as equivalents for forwarding or routing data packets and/or control packets.

Hello Messages

The function of Hello messages is to exchange connectivity information (i.e., link state information) among neighboring nodes. Hello messages provide the foundation for link state routing. A node's group membership information can also be carried by Hello messages. In the hybrid multicast routing protocol, Hello messages are exchanged under the following circumstances (they are not exchanged periodically). First, when a network is initialized, each node exchanges link state information up to TTLOfHello hops in order to build the local link state table. In this stage, the Hello messages are exchanged for unicast routing purpose only and not for building a multicast tree. Second, when a network is in operation after initialization, nodes broadcast a Hello message locally when they become members, or routers, of a multicast group, as well as when they leave a multicast group.

A node includes all its one-hop neighbors in its Hello messages. Whenever a Hello message is received by a receiver node from a sender node, the receiver records the sender's information, as well as the information of the sender's one-hop neighbors, in its neighbor list. An example of the Hello message for the hybrid multicast routing protocol is illustrated in Table 1 below.

TABLE 1

Hello frame format

| Octets: 2 | 2 | 2 | 1 | 1 | 2 | 2 | 2 | 1 | Variable | 1 | Variable |
|---|---|---|---|---|---|---|---|---|---|---|---|
| Frame Control | Destination Address | Source Address | Command Frame Sub-type | TTL | Beginning address | Ending address | Tree level | Number of one-hop neighbors | Addresses of one-hop neighbors | Multicast Control | Multicast Address List |
| Mesh Sublayer Header | | | | | | Mesh Sublayer Payload | | | | | |

In this example, the fields Multicast Control (detailed in Table 2 below) and Multicast Address List in the Mesh Sublayer Payload, are for multicast routing and other fields are used for a unicast routing protocol (i.e., unicast process or algorithm).

TABLE 2

Multicast Control Field

| $b_7 b_6$ | Multicast Update Type | Description |
|---|---|---|
| 00 | Multicast Address List not presented | When the value is "00", the "Multicast Address List" field is empty and does not need to be process. |
| 01 | Newly joined group | This value indicates the "Multicast Address List" field only includes those multicast groups of which this node just became a member since last hello message. |
| 10 | Newly left group | This value indicates the "Multicast Address List" field only includes those multicast groups from which this node just left since last hello message. |
| 11 | Full membership update | This indicates the "Multicast Address List" field includes a full list of multicast groups of which this node is a member. |

Bits $b_5$ to $b_0$ are used as a counter indicating the number of multicast addresses included in the multicast address list.

The Multicast Address List includes all the multicast group addresses of which this node is a member. It can hold up to 64 group addresses. If a node is a member for more than 64 multicast groups, it can use multiple Hello messages to update its group membership to its neighbor nodes.

Neighbor List

To support multicast applications, necessary multicast related information is added in a neighbor list. In one embodiment, for each neighbor in the neighbor list, a field called "Group Membership" is added. This field indicates the multicast groups the node participates in. If a node is a member of many multicast groups, the Group Membership field includes all the multicast group addresses of which this node is a member. An example of the neighbor list is shown in Table 3 below.

TABLE 3

Neighbor list

| Beginning Address | Ending Address | Tree Level | Link Quality | Relationship | Reliable Broadcast | Number of Hops | Group Membership |
|---|---|---|---|---|---|---|---|
| $begAddr_1$ | $endAddr_1$ | $tree\_level_1$ | $LQ_1$ | parent/child/sibling | TRUE | $hops_1$ | $grpAddr_1$ |
| $begAddr_2$ | $endAddr_2$ | $tree\_level_2$ | $LQ_2$ | parent/child/sibling | FALSE | $hops_2$ | $grpAddr_2$ |
| $begAddr_n$ | $endAddr_n$ | $tree\_level_n$ | $LQ_n$ | parent/child/sibling | TRUE | $hops_n$ | $grpAddr_n$ |

Although (TTLOfHello+1)-hop neighbor information can be collected into the neighbor list, the multicast group membership information can be gathered only up to TTLOfHello hops because when nodes broadcast their one-hop neighbor list in their Hello messages, the group membership is not included for those one-hop neighbors. Only the broadcast node's membership information is included. This implies that although sometimes a node can be found in a neighbor list, its multicast membership information is unknown.

Multicast Entities

As used in this description, multicast entities include:

Mesh Coordinator (MC)—indicates the root of the routing tree of a mesh network. It keeps information of all multicast groups in the network. For each multicast group, the group address, the unicast address of the Group Coordinator, and the number of members are recorded. The MC has a Tree Level (TL) equaled to zero. The TL indicates the hop distance a node is from the root of the logical routing tree (i.e., the MC).

Group Member (GM)—indicates a node participating in a multicast group. A GM processes any frames destined to its group address and may send frames to its group. A node can be a GM for multiple groups.

Router (RT)—indicates a node on the multicast tree but not a GM. A router relays multicast frames for a multicast group. A node can be routers for multiple multicast groups.

Group Coordinator (GC)—indicates the controller of a multicast group. Each group shall have its own GC and they can be different nodes. A GC is also a GM.

The Function of Group Coordinator (GC)

Functions of a central controller (i.e., the GC) for each multicast group may include membership management, group key management/distribution and the like. For multicast routing, the GC address can be used (if known) such that join requests to a multicast group can be sent to the GC using unicast routing algorithm.

Interface to the Next Higher Layer—the Primitives

In order to determine the time to join or leave a multicast group, the mesh/network layer provides an interface to its next higher layer (NHL). This interface is defined as primitives between the mesh layer and its NHL. An example of the primitives for multicast group membership management is described below as joining the multicast group and leaving the multicast group.

For joining the multicast group, the primitives used to join a multicast group can be defined as:

```
MHSME-MULTICAST-JOIN.request  (
                               GroupAddress,
                               GCAddress,
                               JoinAsGC
                              )
```

TABLE 4

MHSME-MULTICAST-JOIN.request Parameters

| Name | Type | Valid range | Description |
|---|---|---|---|
| GroupAddress | Integer | 0x0001-0xfffe | The multicast group address |
| GCAddress | Integer | 0x0001-0xfffe | The unicast address of the Group Coordinator |
| JoinAsGC | Boolean | TRUE, FALSE | This flag indicates whether this node is joining as the Group Coordinator. |

```
MHSME-MULTICAST-JOIN.confirm  (
                               Status
                              )
```

The Status indicates the result of the join request.

For leaving a multicast group, the primitive used to leave a multicast group can be defined as:

```
MHSME-MULTICAST-LEAVE.request  (
                                GroupAddress
                               )
```

TABLE 5

MHSME-MULTICAST-JOIN.request Parameters

| Name | Type | Valid range | Description |
|---|---|---|---|
| GroupAddress | Integer | 0x0001-0xfffe | The multicast group the node wants to leave |

```
MHSME-MULTICAST-LEAVE.confirm  (
                                Status
                               )
```

The Status indicates the result of the leave request.

Commands Frames

Command frames are used for nodes to form multicast trees and for them to leave multicast groups. Two command frames defined in this invention are Group Join Request (G-JREQ) defined below in Tables 6 and 7, and Group Join Reply (G-JREP) defined below in Tables 8-10. Their purpose is to determine each node's status/role in a multicast group but not to create routing entries in multicast routing table.

TABLE 6

Group Join Request Frame Format

| Octets: 2 | 2 | 2 | 1 | 2 | 1 | 1 |
|---|---|---|---|---|---|---|
| Frame Control | Destination Address | Source Address | Command Frame Sub-type | Group Address | Join Options | Hop Count |
| Mesh sublayer Header | | | Mesh sublayer Payload | | | |

TABLE 7

The Join Options Field

| Bitmap | Options | Values | Description |
|---|---|---|---|
| 0x01 | Join as GC | TRUE, FALSE | When this option is set, it tells the receivers that the Source Address is the GC's address. It also tells the MC that this node will be the GC for the multicast group. |
| 0x02 | MC as destination | TRUE, FALSE | When this option is set, it tells the receivers that the Destination Address is the MC's address. |
| 0x04 | GC as destination | TRUE, FALSE | When this option is set, it tells the receivers that the Destination Address is the GC's address. |
| 0x08 | G-JREP Requested | TRUE, FALSE | When this option is set, the nodes receive the G-JREQ should wait for a G-JREP before change their statuses. |

TABLE 7-continued

The Join Options Field

| Bitmap | Options | Values | Description |
|---|---|---|---|
| | | | Otherwise, they can change their status as soon as the G-JREQ is received since G-JREP is not requested. |
| 0x10 | ActAsRouter | TRUE, FALSE | When this option is set, the intermediate node which receives this G-JREQ should change its status to RT if it is not a GM or the GC for the group. |
| 0x20-0x80 | Reserved | — | — |

TABLE 8

Group Join Reply Frame Format

| Octets: 1 | 2 | 2 | 1 | 2 | 1 | 1 |
|---|---|---|---|---|---|---|
| Frame Control | Destination Address | Source Address | Command Frame Sub-type | Group Address | Join Option | Status |
| Mesh sublayer Header | | | Mesh sublayer Payload | | | |

TABLE 9

Join Options of G-JREP

| Bitmap | Meanings | Values | Description |
|---|---|---|---|
| 0x01 | ActAsRouter | TRUE, FALSE | When this option is set, the intermediate node which receives this G-JREQ should change its status to RT if it is not a GM or the GC for the group. |
| 0x02-0x80 | Reserved | — | — |

TABLE 10

Status of G-JREP

| Bitmap | Meanings | Values | Description |
|---|---|---|---|
| 0x01 | Success | TRUE, FALSE | When this option is set, the joining node has successfully joined the targeted node (a GM, the MC or the GC). |
| 0x02 | Failure | TRUE, FALSE | When this option is set, the joining node has failed to join the targeted node. The reason can be given by other bits of this field. |
| 0x04 | GC not joined yet | TRUE, FALSE | When this option is set, the G-JREQ has reached the MC but the GC has not joined yet. |
| 0x08-0x80 | Reserved | — | — |

Group Communication Table

Each node involved in multicast communications maintains a group communication table (Table 11 below). The group communication table is used to record the multicast groups, of which, this node is a participant (a member, a router or the GC) and its status in each of the groups. The group communication table is used to forward the multicast data frames and is updated whenever a Hello message with multicast extension is received.

TABLE 11

Group Communication Table

| Group Address | Status (Bitmap) | Number of 1-hop Neighbors to the Group |
|---|---|---|
| 10 | GC | 2 |
| 1,000 | GM | 3 |
| 11,000 | RT | 2 |

A Status Field (Table 12 below) describes the function a node plays in a multicast group. The status values include MC, GC, GM, and RT. Different combination of status values may exist for a node, such as MC and GM, MC but not GM, GC and GM. A bitmap can be used to record all applicable status values a node has for a group. The "Number of 1-hop Neighbors to the Group" field may be used to help a node to decide the way a multicast data frame is relayed, unicast or broadcast at the MAC layer.

TABLE 12

Status Field

| Status (8-bit Bitmap) | Description |
|---|---|
| 0x01 | GM |
| 0x02 | RT |
| 0x04 | GC |
| 0x08 | MC |
| 0x10-0x80 | Reserved |

FIG. 1 shows a functional block diagram of a mesh network 10 including wireless stations 11, 12 (i.e., nodes), implementing a hybrid multicast routing protocol, according to an embodiment of the invention. Each of the wireless stations includes an application layer 13, a mesh (network) layer 14 implementing the hybrid multicast routing protocol and exchange of control and data messages, a data link layer 15 (including a logical link control sublayer and the MAC sublayer), a physical layer (PHY) 16 and a radio front end 17. The wireless stations send and receive information via antennas 18 using radio frequency (RF) communication.

Figure 2:
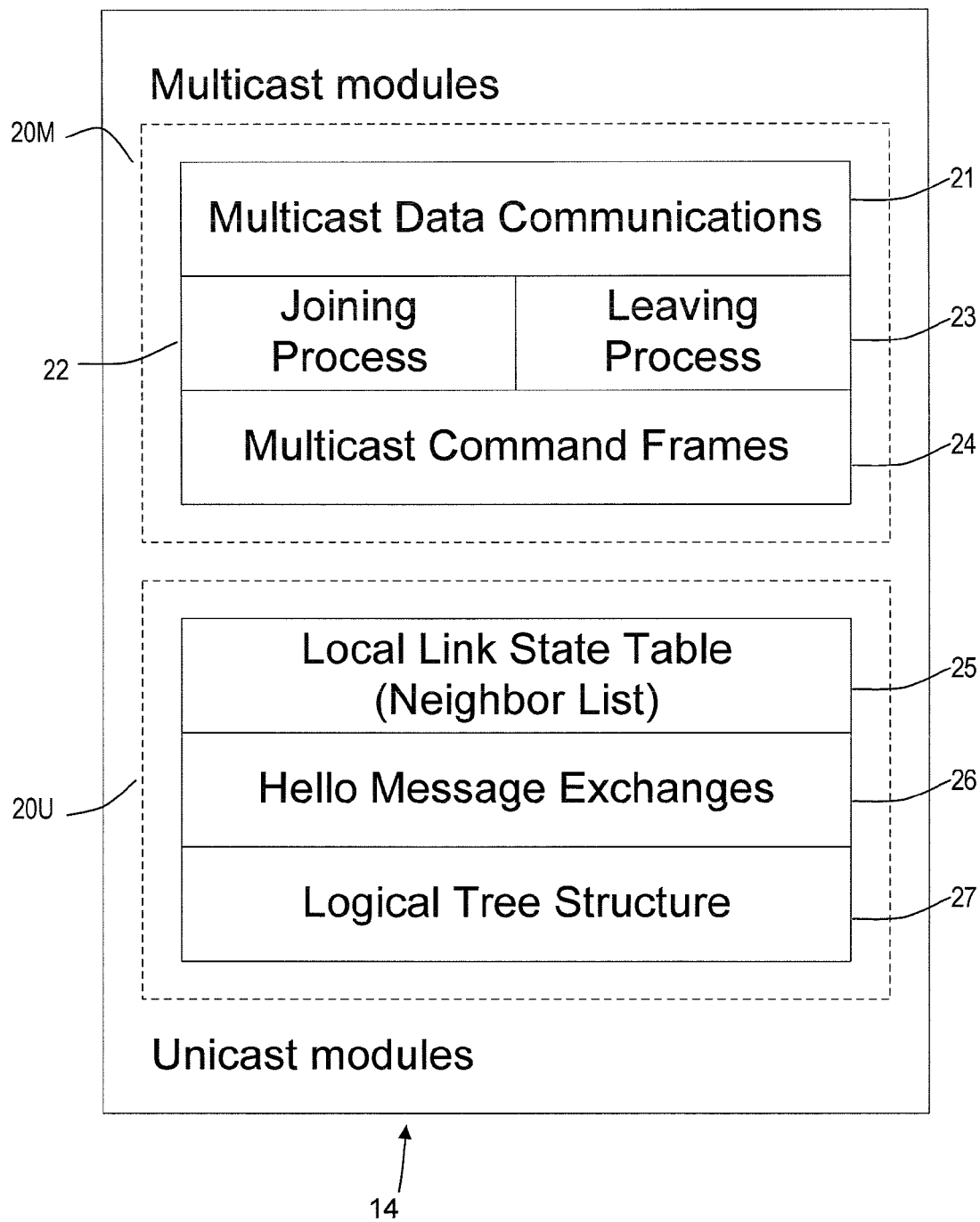
FIG. 2 shows a functional block diagram of embodiments of the mesh (network) layer modules, according to an embodiment of the invention.

FIG. 2 shows a functional block diagram of the mesh (network) layer module 14. The module 14 includes the multicast module 20M and unicast module 20U. The modules 20M and 20U may comprise software modules or firmware stored in memory, and executing on processors in the wireless stations. The modules 20M and 20U may also comprise logic circuits, Application Specific Integrated Circuits (ASIC), etc. Other implementations of the modules 20M and 20U are also possible as those skilled in the relevant art will appreciate.

The multicast module 20M includes a multicast data communications module 21, a joining process module 22, a leaving process module 23 and multicast command frames 24. The joining process module 22 and leaving process module 23 implement protocols useful for various types of wireless stations. The unicast module 20U includes a local link state table (i.e., neighbor list) 25, a Hello Message exchange module 26 and a logical tree structure module 27.

Figure 3:
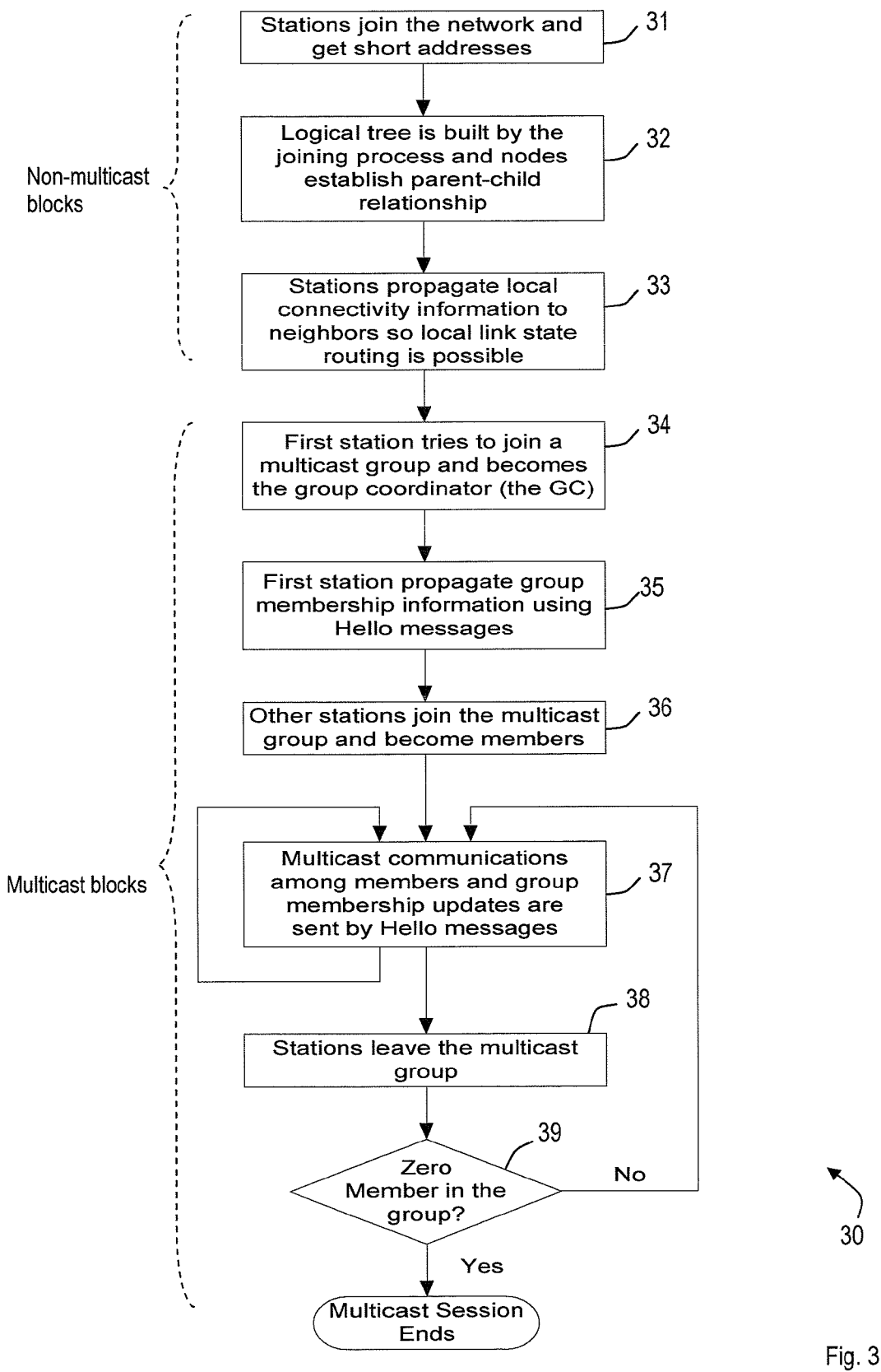
FIG. 3 shows a flowchart of a hybrid multicast routing protocol process, according to an embodiment of the invention.

FIG. 3 shows a flowchart of a hybrid multicast routing protocol process 30 implemented by the wireless stations (nodes), according to an embodiment of the invention. In the process 30, process blocks 31-33 are non-multicast process blocks, while process blocks 34-39 are multicast process blocks. In process block 31, stations (nodes) join the wireless mesh network and get short addresses. In process block 32, a logical tree is built by the joining process module and nodes establish parent-child relationship. In process block 33, stations propagate local connectivity information to neighbors so that local link state routing is possible. In process block 34, a first station tries to join a multicast group and becomes the group coordinator (the GC). In process block 35, a first station propagates group membership information using Hello messages. In process block 36, other stations join the multicast group and become members. In process block 37, multicast communications among members and group membership updates are sent by Hello messages.

In process block 38, one or more stations may leave the multicast group using the leaving process module. A multicast member node can leave a multicast group at any time. To leave a multicast group, a node broadcasts a Hello message to its neighbors with the Multicast Update Type set to "Newly left group" and the multicast group address included in the "Multicast Address List" field. Neighbors receiving this Hello message update their neighbor table to reflect the fact that they are no longer able to reach the multicast group through this leaving member node.

In process block 39, it is determined if no members remain in the group. If not, then the process proceeds back to block 37, otherwise the multicast session ends.

Further details of the hybrid multicast routing protocol process including joining a multicast group, leaving a multicast group and multicast data forwarding is described in sections A, B, C below, respectively.

A. Joining the Multicast Group

A node's process of joining a multicast group is initiated by receiving a MHSME-MULTICAST-JOIN primitive from the next higher layer when it is not already a member of that group, or when it has a message to send to the multicast group but does not have a route to that group. There are two cases of joining, joining as the Group Coordinator (GC) or joining as a regular member.

Joining as the Group Coordinator (GC)

If the node is set to be the GC of this multicast group (as indicated in the primitive), it sends a G-JREQ command with the Destination Address set to the MC's unicast address. It also sets the "MC as destination", "Join as GC" and "G-JREP Requested" option to TRUE. The G-JREQ is forwarded to the MC following the unicast algorithm (not necessarily following the tree links).

Intermediate nodes which receive the G-JREQs treat them as regular unicast command frames and forward them to the MC. When relaying the G-JREQs to the MC, intermediate nodes do not need to cache backward routes in order to route G-JREPs back to the joining node.

Once the G-JREQ arrives at the MC, the MC checks its Multicast Group Record for the specified multicast group. If the record for this group does not exist, the MC creates an entry for this multicast group in its Multicast Group Record. The entry includes the multicast group address, the logical address of the GC and the number of members in the group; if the record for this group does exist but with a different address of the GC, it means this new GC is to replace the current GC in the MC's record. The MC updates its record with this new GC information. If the record for this group does exist but with the address of GC empty and the number of group members larger than one, it means other nodes have tried to join the group before the MC.

The MC then replies back with a G-JREP toward the source of the G-JREQ with the joining node's unicast address as the Destination Address, the "Join as GC" option set to TRUE and the Status field set to indicate the status of joining. Intermediate nodes between the MC and the GC shall forward the G-JREP back to the GC using the unicast routing process (whereby the intermediate nodes need not record the backward route when the G-JREQ is received). The intermediate nodes need not change status to routers because the option "ActAsRouter" is set to FALSE in the Join Options field.

When the G-JREP travels back to the joining node (i.e., the GC), the GC updates its Group Communication Table by creating a new entry for this multicast group and sets its status to GC. The joining node is now a member of the multicast group. It sends a Hello message to its neighbors to update them on its multicast group membership.

Figure 4:
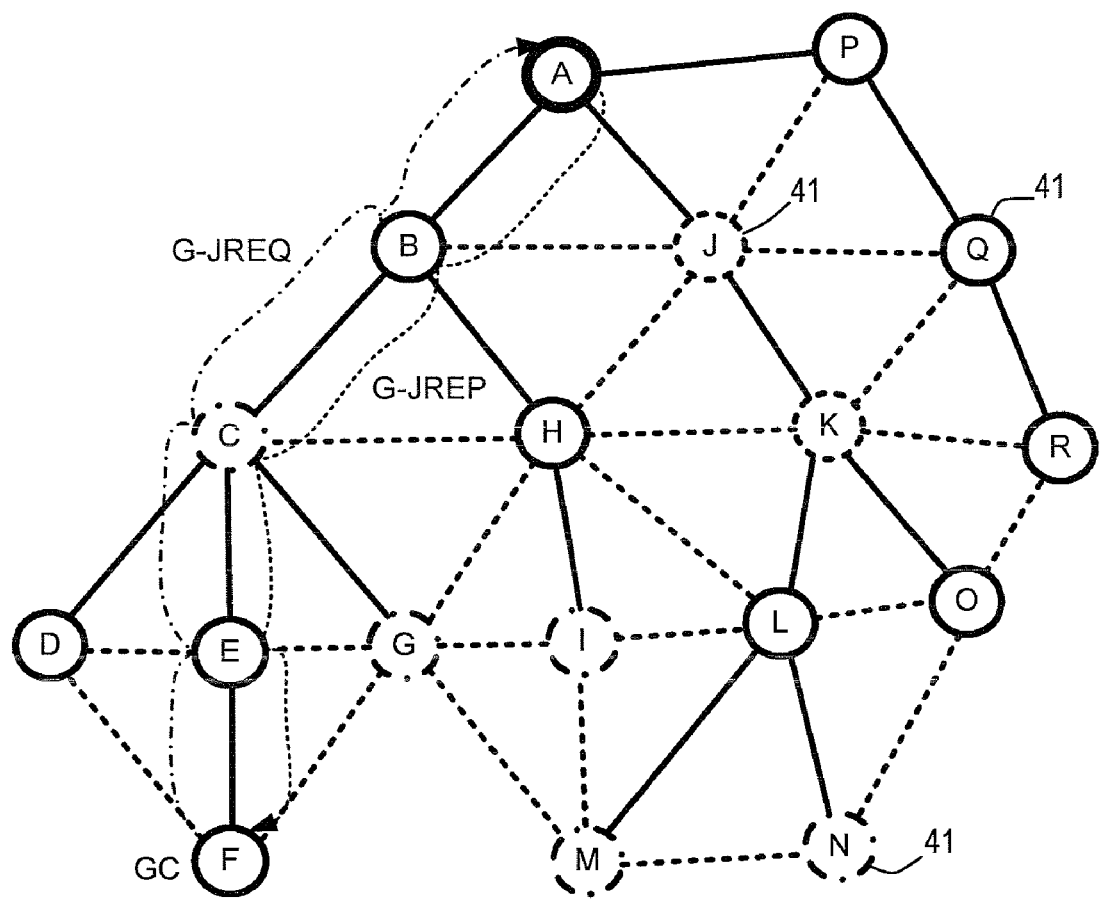
FIGS. 4-7 show examples of logical trees and nodes joining a multicast group using a hybrid multicast routing protocol, according to embodiments of the invention.

FIG. 4 shows an example logical tree of a multicast group for a wireless mesh network 40 including nodes 41 (i.e., nodes A-R), wherein a GC node joins the multicast group Links between nodes indicate direct communications exist between nodes. In the drawings, solid links (solid straight lines) between nodes represent tree links while dashed links (dashed straight lines) between nodes represent mesh links). In FIG. 4, Node F is determined to be the GC of the group. It sends a G-JREQ all the way to the MC, node A. The MC records the group and GC information, and then sends back a G-JREP all the way back to Node F. In this example the tree route F→E→C→B→A is the shortest path from node F to node A. In fact, node F can take any shortest path between node F and node A, such as F→G→C→B→A, F→G→H→B→A or F→G→H→J→A.

Joining as a Group Member

Except for the GC, all other nodes join the multicast group following the process described in this section. The general joining process includes the following two overall steps:

1. Search the neighbor list for existing members in the group:
   a. If existing member found, join through one of the members.
   b. If existing member not found, go to step 2.
2. Check whether the GC's address is known:
   a. If the GC's address is known, search the neighbor list for the GC to join:
      i. If the GC is found in the neighbor list, join through the GC;

ii. If the GC is not found in the neighbor list, route the G-JREQ to the GC using unicast.
b. If the GC's address is not known, check whether the G-JREQ has reached the MC:
i. If this node is the MC, find the GC's address in its Multicast Group Records, then go to step 2a.
ii. If this node is not the MC, forward the G-JREQ to its parent node.

The nodes need not record the backward routes under any circumstances because the G-JREPs can always find their routes back to the G-JREQ originator using the unicast process. This reduces memory requirements.

Whenever a member or the GC is found in the neighbor list, a node can send a G-JREP back to the source using the unicast process and need not wait for the final destination of the G-JREQ to send the G-JREP. Using the unicast process, instead of the route taken by the G-JREQ, to send the G-JREP could utilize the mesh link so that the route may be shortened. The two overall steps of the joining process are described in more detail below.

Step 1. Search the Neighbor List for any Member or Router to Join with:
If one or more group members or routers are found, the node chooses one of the members that are the closest to it. When there are multiple member nodes in the neighbor list, it is preferable to choose the tree link because the tree link is established with the consideration of link quality and hence more robust. Mesh links are not created with the consideration of the link quality.

The node then sends a G-JREQ to the selected existing member using the unicast process (link state routing because the member is in the neighbor list). The Destination Address of the G-JREQ is set to the member's address. Because the member is in the neighbor list of the joining node, when the joining node sends the G-JREQ, it can optionally set the "G-JREP Requested" flag to FALSE, which means the joining node does not request G-JREP from the member or any other nodes in between them. The ActAsRouter flag of the G-JREQ is set to TRUE if the "G-JREP Requested" flag is FALSE. In this case, the joining node also deems itself as joining the multicast group after it has sent the G-JREQ.

When the intermediate nodes in between the joining node and the existing member receive the G-JREQ, they first check the value of the "ActAsRouter" flag in the G-JREQ. If the "ActAsRouter" flag is set to TRUE, intermediate nodes change their status to RT for this group as soon as they receive the G-JREQ. If the "ActAsRouter" flag is to FALSE in the G-JREQ, intermediate nodes do not change their status until they receive the G-JREP. The intermediate nodes then forward the G-JREQ to the existing member in the neighbor list of the joining node.

When the G-JREQ finally reaches the existing member, the member replies with a G-JREP if the "G-JREP requested" flag is set to TRUE. The member node also sets the "ActAsRouter" flag to TRUE to indicate that intermediate nodes receiving the G-JREP change their status to RT. The G-JREP travels back to the joining node using the unicast routing process. Intermediate nodes change their status to RT after forwarding the G-JREP. The G-JREP finally travels back to the joining node. If the "G-JREP requested" flag is set to FALSE, no step is taken.

After the joining node changes its status to GM and the intermediate nodes change their status to RT, the nodes send a Hello message to their neighbors to announce their capability of reaching the multicast group. For routing purposes, there are no differences between members and routers. As such, even routers announce that they are members of a certain multicast group.

Figure 5:
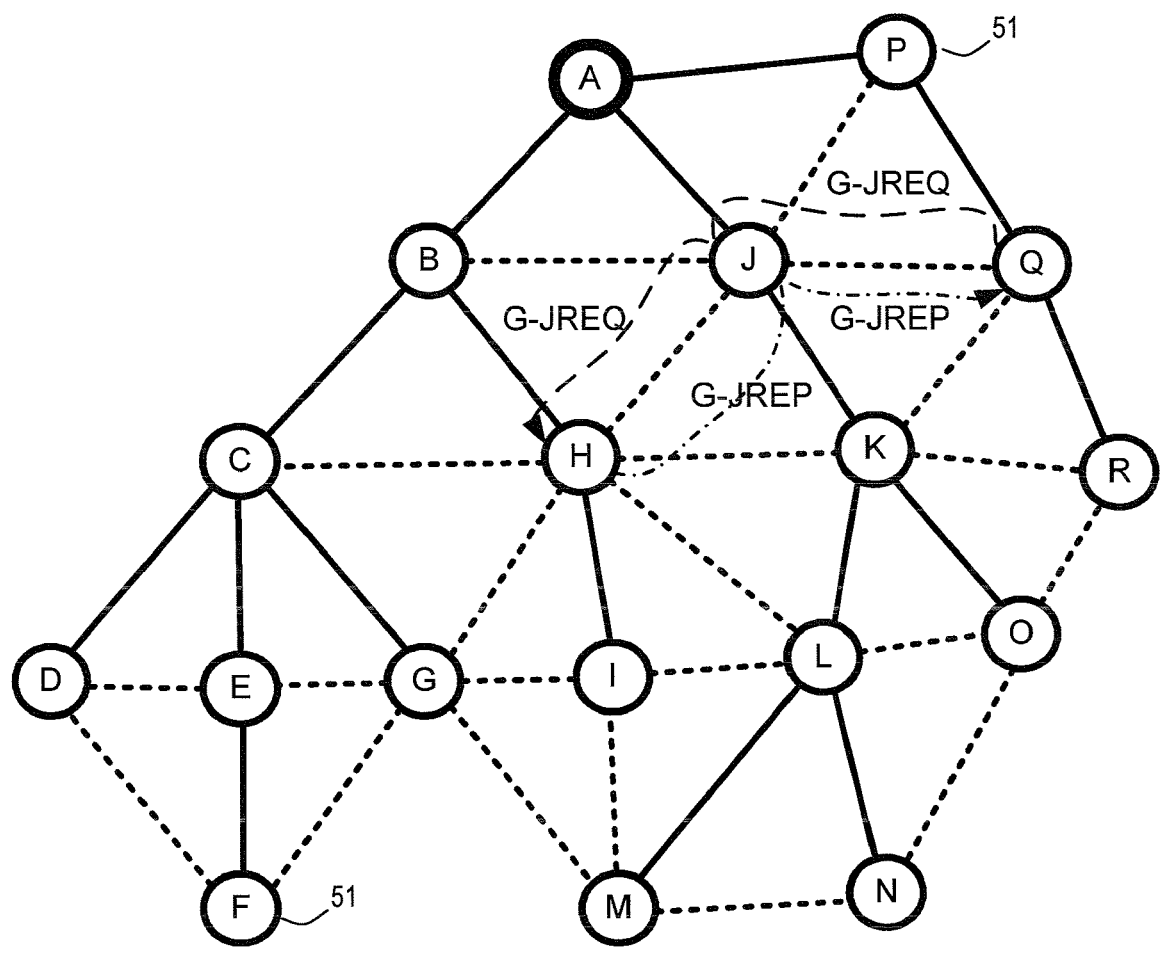

Referring to the example multicast group for a network 50 in FIG. 5 including nodes 51 (e.g., nodes A-R), the TTL of hello message (TTLOfHello) is set to 2. The node H is a member of a multicast group and the node Q is going to join this group without knowing the GC's address. The node H is the only member in the node Q's member list. The node Q first searches its neighbor list for the members of this group. The node Q finds the node H, which is two hops away from it. The node Q identifies two next hops, nodes J and K, which have the shortest paths to the node H, using the unicast routing process. The node Q then selects node J as its next hop to node H and sends G-JREQ to node J (with node H's address as the Destination Address and the "G-JREP requested" flag set to TRUE). Node J uses the similar approach as node Q and easily finds node H as its one-hop neighbor. Since node Q can find node H in its neighbor list, which means a route to node H can be found without doubt, node Q may optionally change its status to GM without requesting a G-JREP from H or intermediate nodes. Node Q does so by setting the "G-JREP requested" flag to FALSE and the "ActAsRouter" flag to TRUE. When receiving a G-JREQ with "ActAsRouter" flag set to TRUE, node J knows it may now become a router of this multicast group even without receiving a G-JREP. Both nodes Q and J send a Hello message locally to announce their involvement in the group.

Although node Q's three-hop neighbors, such as nodes C, G, I, M and N, are also in node Q's neighbor list, node Q does not know their multicast group membership. This is due to the fact the TTLOfHello is set to 2, which means only nodes within two hops can send their multicast group membership to node Q. Node Q becomes aware of the existence of node C, G, I, M and N because they were reported by node Q's two-hop neighbors.

Step 2. Search the Neighbor List for the GC if GC's Address is Known
The GC's address may be provided in the MHSME-MULTICAST-JOIN.request primitive or in the G-JREQ command frame received from other nodes (when the "GC as Destination" option is set to TRUE, the unicast address in the Destination Address field is the address of the GC).
If the GC is found in the neighbor list, the joining node sends a G-JREQ to the GC node using the unicast routing process with the GC's address as the Destination Address in the command frame. The "G-JREP requested" flag may be set to FALSE and the "ActAsRouter" flag set to TRUE to join without waiting for the G-JREP.
If the GC is not found in the neighbor list, the joining node continues to route the G-JREQ to the GC node using the unicast routing process. Even though the GC's address is known and is placed in the Destination Address field, it does not mean that only the GC can reply with the G-JREP. Any members or routers may reply to the joining node in order for the node to quickly join the multicast group.

Figure 6:
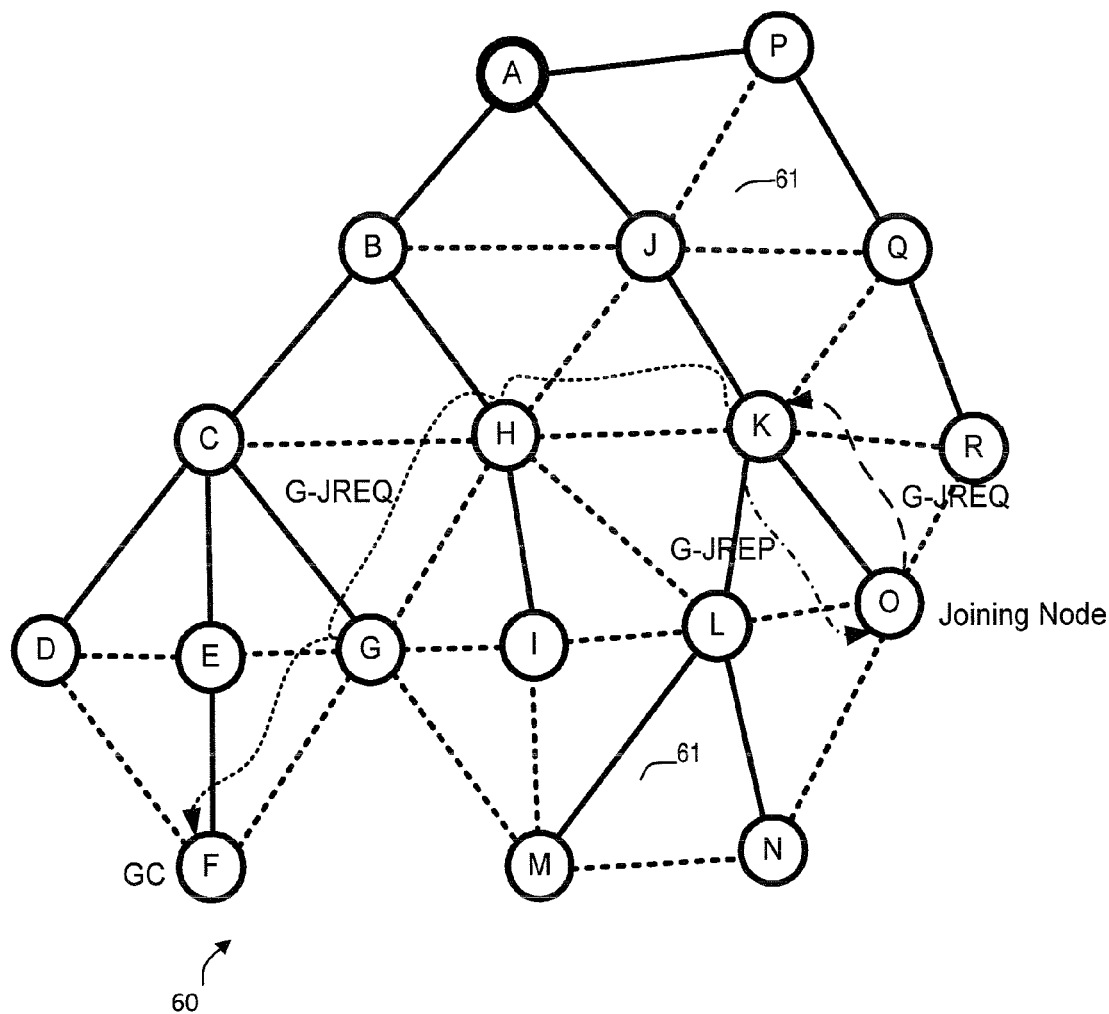

Referring to the example multicast group for a network 60 in FIG. 6 including nodes 61 (e.g., nodes A-R), node O is the joining node and node F is the GC. There are neither members nor routers in the neighbor list of node O. Node F's unicast address is known to node O when it attempts to join the group.

Since no members and GC can be found in the neighbor list, the G-JREQ is routed using the unicast routing process. This is achieved by sending the G-JREQ to node O's parent, node K. Node K searches it neighbor list for members in this group and fails to find one. Node K then continues to search the GC in its neighbor list. This time node K is able to find the GC, node F, is in its neighbor list. Node K may send a G-JREP back to node O and forward the G-JREQ toward node F with the "G-JREP requested" flag set to FALSE and the "ActAsRouter" flag set to TRUE. All nodes in between node O and node F (i.e., nodes K, H, and G) become routers and node O becomes a member.

Alternatively, if the GC's address is not known and the joining node is not the MC, the node forwards the G-JREQ to its parent node. If the GC's address is not known but the joining node is the MC, the joining node searches its Multicast Group Record for the information of this multicast group. If group and GC information is not available, it means the GC is not presented in the network. MC records the information (group address and increases the counter of number of members presented) and sends a G-JREP with the Status field indicating a reason for join failure.

If the group and GC information is available, the joining node replaces the Destination Address with the GC's address in the G-JREQ and forwards the G-JREQ to the GC.

Figure 7:
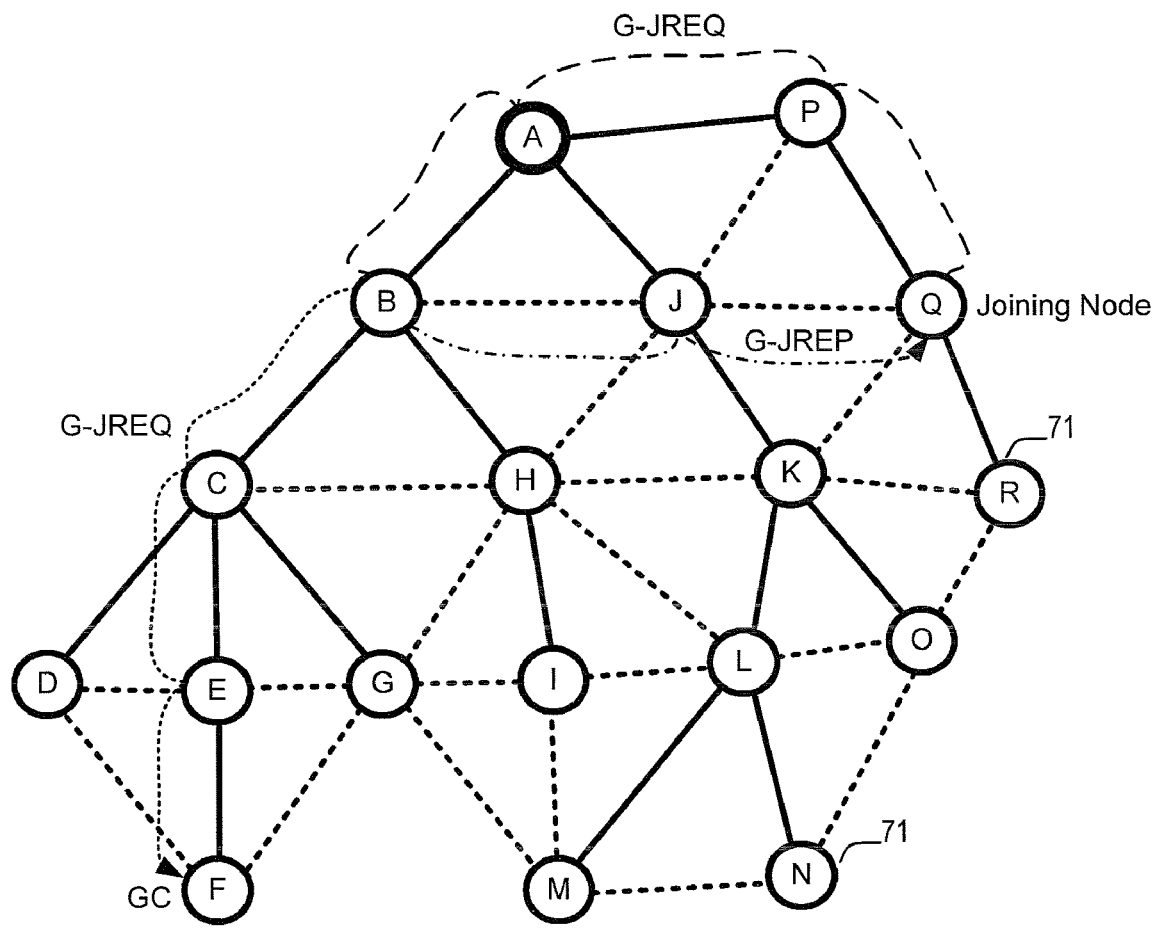

Referring to the example multicast group for a network 70 in FIG. 7 including nodes 71 (e.g., nodes A-R), node Q is the joining node and node F is the GC and the only member in the network for this group. There are neither members nor routers in the neighbor list of node Q. Comparing to the previous example in FIG. 6, the difference in the example here is that the GC's address is not known to the joining node Q. Therefore, node Q sends a G-JREQ to its parent node P, with the "G-JREP requested" flag set to TRUE and the "ActAsRouter" flag set to FALSE. Node P can find neither a member nor the GC in its neighbor list, so it forwards the G-JREQ to its own parent node, which in this case happened to be the MC (i.e., node A). Since the GC has already registered with the MC, it is known where the GC is. As such, going forward, the GC's address in placed in the Destination Address field and the packet is routed toward the GC using the unicast process.

When the G-JREQ reaches node B, node B finds that the GC (node F) is in its neighbor list. Node B can decide whether it should wait for the G-JREP from the GC, or reply with its own G-JREP back to the joining node. Assuming node B decides to reply with its own G-JREP back to the joining node, node B sends the G-JREP using the unicast process with the "ActAsRouter" flag set to TRUE. In this example, the G-JREP takes the route B→J→Q using its neighbor list instead of following the route the G-JREQ took (i.e., B→A→P→Q). As a result, there is no need to record backward routes to the joining node (a better route may be found from the other direction).

In the meantime, node B continues to forward the G-JREQ to the GC using the unicast routing process. The "G-JREP requested" flag may be set to FALSE and the "ActAsRouter" flag may be set to TRUE so that nodes C and E change their status upon receiving the G-JREQ.

When a wireless station node joins a multicast group in the network, each group member (GM) or router (RT) propagate this information using Hello messages. Multicast data packets need not be routed. It is done by checking the status of the node is for this group (i.e., whether the node is a GM, RT or others). If the node is a GM or RT, then the node simply broadcasts the data packet. Only control packets need to be routed to find a member to join with or leave from in a group.

Figure 8:
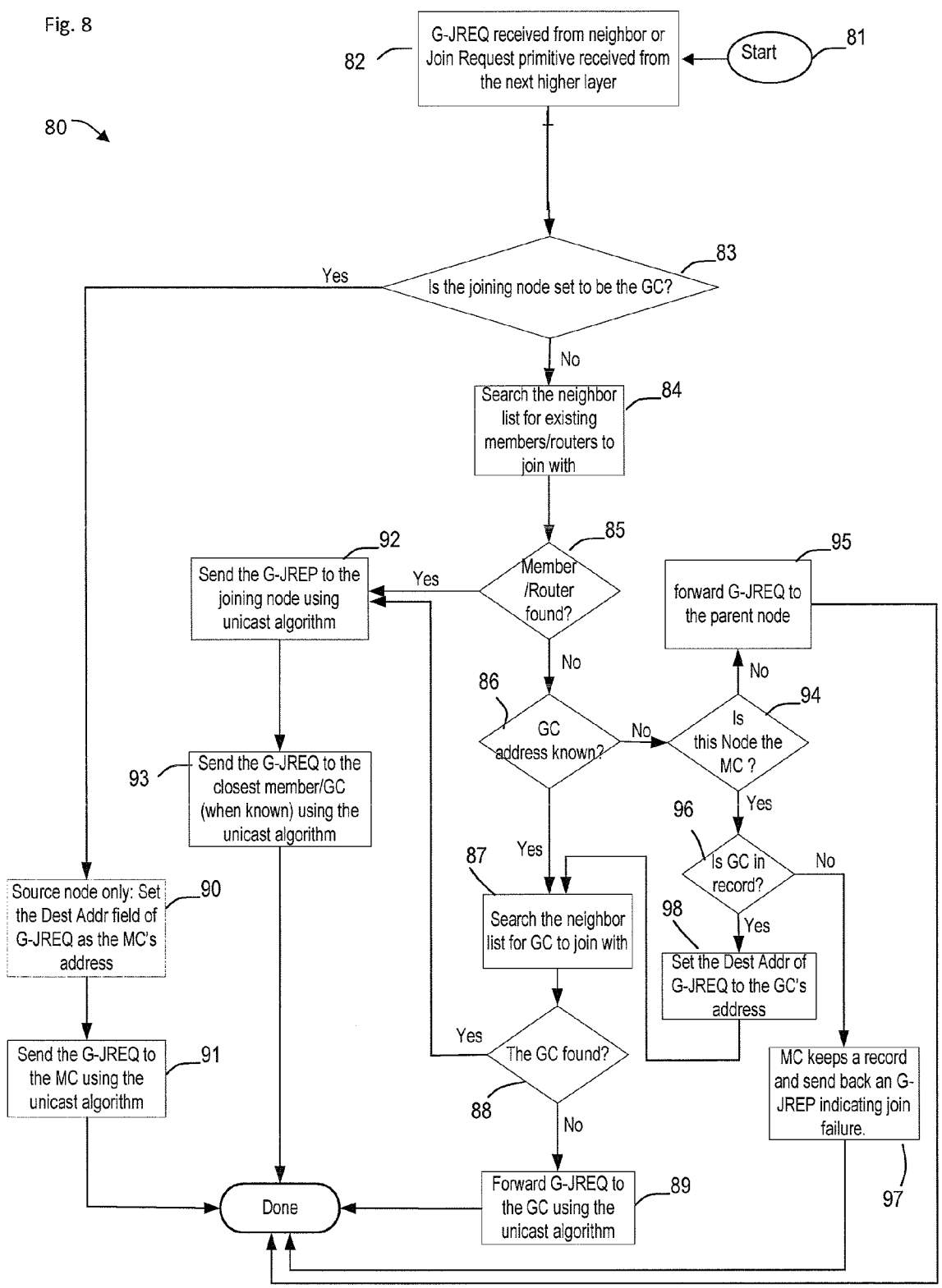
FIG. 8 shows a flowchart of a joining process of a hybrid multicast routing protocol process, according to an embodiment of the invention.

FIG. 8 shows an example joining process 80, according to an embodiment of the invention, including the following process steps:

Step 81: Start.

Step 82: G-JREQ received from neighbor or Join Request primitive received from the next higher layer.

Step 83: Is the joining node set to be the GC? If yes, proceed to step 90, otherwise proceed to step 84.

Step 84: Search the neighbor list for existing members/routers to join with.

Step 85: Member/Router found? If not proceed to step 92, otherwise proceed to step 86.

Step 86: GC address known? If yes, proceed to step 87, otherwise proceed to step 94.

Step 87: Search the neighbor list for GC to join with.

Step 88: The GC found? If yes, proceed to step 92, otherwise proceed to step 89.

Step 89: Forward G-JREQ to the GC using the unicast algorithm. Done.

Step 90: Source node only: Set the Dest Addr field of G-JREQ as the MC's address.

Step 91: Send the G-JREQ to the MC using the unicast algorithm. Done.

Step 92: Send the G-JREP to the joining node using unicast algorithm.

Step 93: Send the G-JREQ to the closest member/GC (when known) using the unicast algorithm. Done.

Step 94: Is this Node the MC? If yes, proceed to step 96, otherwise proceed to step 95.

Step 95: Forward G-JREQ to the parent node. Done.

Step 96: Is GC in record? If yes, proceed to step 98, otherwise proceed to step 97.

Step 97: MC keeps a record and sends back a G-JREP indicating join failure. Done.

Step 98: Set the Dest Addr of G-JREQ to the GC's address. Proceed to step 87.

B. Leaving the Multicast Group

A multicast member node can leave a multicast group at any time. However, before it leaves a group, the member first checks whether it is a leaf node of the multicast tree. The member checks the number of members among its one-hop neighbors which belong to this group as indicated in the "Number of 1-hop Neighbors to the Group" field of the Group Communication Table. If the number is one, said member can leave the group. Otherwise, the member can only change its status to RT and still remain in the multicast tree. In this case, no Hello message needs to be sent. The member node only needs to change its status in the Group Communication Table. To leave a multicast group, a node broadcasts a Hello message to its neighbors with the Multicast Update Type set to "Newly left group" and the multicast group address included in the "Multicast Address List" field. Neighbors receiving this Hello message update their neighbor table to reflect the fact that they are no longer able to reach the multicast group through this leaving member node.

Whenever a 1-hop neighbor node leaves a multicast group or becomes unreachable, the node reduces the "Number of 1-hop Neighbors to the Group" in the Group Communication Table by one. When this number becomes zero, the node has lost the connection to the multicast group. The node restarts the process of joining the group and tries to reconnect to the multicast tree.

C. Multicast Data Forwarding

Unlike conventional routing protocols, a routing table is not required for multicast data forwarding, according to an embodiment of the invention. The decision for forwarding or not depends on the status (e.g., member, router, etc.) of the node. When a multicast data frame is received from NHL or from a neighbor node, the node first checks its status in this multicast group by looking up the Group Communication Table. If the corresponding entry exists and the node is the GC, a GM or a router of this multicast group, the node relays the frame by broadcast at the MAC layer.

If the corresponding entry does not exist or if the entry exists but the node is neither the GC, nor a GM, nor a router, the node checks where the data frame originated from. If the frame is from a neighbor node, said node discards the frame because it is not on the multicast tree and does not route the data frame for this multicast group. If the frame is from said node's NHL, it means the node wishes to be a member of this group. The node initiates the joining process to join the multicast group first and then relays the frame. The data frame is stored in the memory buffer of this node and forwarded after the node joins the multicast group.

To reduce the broadcast traffic at the MAC layer, a node checks the number of 1-hop neighbors which are members or routers of the multicast group before forwarding the data frame (using the multicast communication table). If the number is one, then this node is a leaf node and the data frame must be received from its own NHL. The node unicasts the data frame to its next hop member. If the number is two (including the neighbor from which it received the frame), the node determines whether the data frame is from its own NHL or received from other nodes. If the frame is from its NHL, the node broadcasts the data frame to its next hops; otherwise, this frame is from one of its two member neighbors. The node may choose to unicast the data frame only to the other next hop member. If the number is more than two, the node broadcast the data frame at the MAC layer. When certain nodes in the network are running in a low-power mode, broadcast takes more effort (longer delay) to be achieved. As such, it is preferable to use unicast whenever it is possible.

As such, the invention provides a communication protocol that supports multicast communications in wireless mesh networks, applicable to, e.g., mesh wireless local area networks (WLANs) and mesh wireless personal area networks (WPANs) in applications such as home automation and networking, peer-to-peer networking, commercial building automation, automatic meter reading, inventory tracking and control, etc.

Compared to conventional Multicast AODV, a hybrid multicast routing protocol for wireless mesh networks according to an embodiment of the invention does not require network-wide broadcast control packets and provides shorter joining delay (MAODV has to wait for RREP for a preset period of time after sending out the RREQ). The hybrid multicast routing protocol does not require periodic network-wide hello messages or routing table. The hybrid multicast routing protocol enjoys lower power consumption, more robustness due to local link state routing and simplicity. No complex sequence number needs to be maintained.

Compared to conventional tree-based multicast routing, the hybrid multicast routing protocol uses mesh links that provide higher degree of connectivity to the network (this is especially useful when the tree links break). The hybrid multicast routing protocol further provides better routers due to the utilization of mesh links which can provide link state routes crossing different branches of the tree. The hybrid multicast routing protocol also has fewer number of command frames, and simplified joining and leaving processes. The invention is further useful with IEEE 802.15.5 wireless personal area network (WPAN) low rate mesh networks and similar networks such as low rate mesh networks.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of multicast routing in a wireless mesh network, comprising: maintaining a multicast logical tree having a structure establishing parent-child connectivity relationships between wireless station nodes, wherein each node has access to local connectivity information for its local nodes; a wireless station node joining a multicast group in the network, and each group member or router propagating group membership information and the local connectivity information via message transmission among its local nodes in the logical tree; and performing multicast packet forwarding communications among the multicast group members, wherein multicast packets comprise group request and group reply command frames, wherein a forwarded group reply command frame is not required to follow a route of a group request command frame, wherein a node is configured such that when a multicast group member or group coordinator is in a neighbor list of an intermediate node in relation to the joining node, then receiving a group reply packet without waiting for the group request packet to reach the multicast group member or the group coordinator.

2. The method of claim 1 further comprising:
one or more other wireless station nodes joining the multicast group and becoming members, wherein
performing multicast packet forwarding communications among the multicast group members is based on the tree structure and local link state information.

3. The method of claim 2, wherein the logical tree spans all nodes in the network providing forwarding of multicast control packets, wherein group request command frames comprise Group Join REQuest (G-JREQ) command frames, and group reply command frames comprise Group Join REPly (G-JREP) command frames, wherein each control packet is forwarded to appropriate nodes by checking the control packet destination address.

4. The method of claim 3 further including maintaining a neighbor list for each node, wherein each neighbor list comprises multicast related information for member nodes of each multicast group said node participates in.

5. The method of claim 4, wherein forwarding each G-JREQ command frame includes:
unicast forwarding the G-JREQ command frames without requiring recording backward forwarding for G-JREP command frames.

6. The method of claim 4, wherein a forwarded G-JREP command frame is not required to follow the route of a G-JREQ command frame, for utilizing a mesh link for short routes.

7. The method of claim 4, further including:
providing multicast membership information in the neighbor list of each node, such that a G-JREQ command frame is transmitted by a node directly to one of the member neighbor nodes in the neighbor list of that node.

8. The method of claim 4, wherein forwarding a G-JREQ command frame includes:
when no members are found in the neighbor list of a node, forwarding the G-JREQ command frame to a unicast address of a group coordinator if the group coordinator address is known.

9. The method of claim 4 further including:
when a joining node is set to be the group coordinator of a group, forwarding a G-JREQ command frame directly to a mesh coordinator.

10. The method of claim 4 further including:
when neither a member nor a group coordinator is found in the neighbor list, forwarding a G-JREQ command frame to a parent of the node.

11. The method of claim 4 further including providing multicast group membership updates using the neighbor list by exchanging messages among the member nodes of each multicast group.

12. The method of claim 4 further including:
a member node leaving a multicast group by broadcasting a message to its local nodes; and
each local node in the multicast group receiving the message, updating its neighbor list to reflect that the local node can no longer reach remaining nodes in said multicast group through the leaving member node.

13. The method of claim 12 further including ending a multicast group when no members remain in the multicast group.

14. The method of claim 12, wherein the local connectivity information for a node comprises local communication link state information for a number of hops in relation to the node in the network.

15. The method of claim 12, wherein no control messages are broadcast.

16. The method of claim 12, wherein said messages are exchanged when the network is in operation after initialization, each node broadcasting a message locally when the node becomes a member, or router, of a multicast group, as well as when leaving a multicast group.

17. The method of claim 1, wherein multicast data forwarding is performed without a routing table.

18. The method of claim 4, further comprising:
determining whether a member or a group coordinator is included in the neighbor list; and
upon determining that the member or the group coordinator is included in the neighbor list, unicast sending a G-JREP command frame from a node to a source without waiting for a final destination of the G-JREQ command frame to send the G-JREP command frame.

19. The method of claim 1, wherein each neighbor list includes a field for indicating multicast groups that member nodes participate in.

20. A system for multicast routing in a wireless mesh network, comprising: a multicast logical tree module maintaining a multicast tree having a structure establishing parent-child connectivity relationships between wireless station nodes, wherein each node has access to local connectivity information for its local nodes; a wireless station node configured for joining a multicast group in the network, and each group member or router wireless station node configured for propagating group membership information and the local connectivity information via message transmission among its local nodes in the logical tree; and one or more other wireless station nodes configured for joining the multicast group, becoming members, and performing multicast packet forwarding communications among the multicast group members, wherein multicast packets comprise group request and group reply command frames, and a forwarded group reply command frame is not required to follow a route of a group request command frame, wherein a node is further configured such that when a group member or group coordinator is in a neighbor list of an intermediate node in relation to the joining node, then receiving a group reply packet without waiting for the group request packet to reach the group member or the group coordinator.

21. The system of claim 20 wherein
performing multicast packet forwarding communications among the multicast group members is based on the tree structure and local link state information.

22. The system of claim 21, wherein the logical tree spans all nodes in the network providing forwarding of multicast control packets, wherein group request command frames comprise Group Join REQuest (G-JREQ) command frames, and group reply command frames comprise Group Join REPly (G-JREP) command frames, wherein each control packet is routed to appropriate nodes by checking the control packet destination address.

23. The system of claim 22, wherein each node maintains a neighbor list for each node, wherein each neighbor list comprises multicast related information for member nodes of each multicast groups said node participates in.

24. The system of claim 23, wherein each node forwards each G-JREQ command frame by unicast forwarding the G-JREQ command frame without requiring recording backward forwarding for a G-JREP command frame.

25. The system of claim 23, wherein a forwarded G-JREP command frame is not required to follow the route of a G-JREQ command frame, for utilizing a mesh link for short routes.

26. The system of claim 23, wherein the neighbor list of each node further includes multicast membership information, such that a G-JREQ command frame is transmitted by a node directly to one of the member neighbor nodes in the neighbor list of that node.

27. The system of claim 23, wherein each node forwards a G-JREQ command frame such that when no members are found in the neighbor list of a node, the G-JREQ command frame is forwarded to a unicast address of a group coordinator if the group coordinator address is known.

28. The system of claim 23, wherein when a joining node is set to be the group coordinator of a group, the joining node forwards the G-JREQ command frame directly to a mesh coordinator.

29. The system of claim 23, wherein for each node, when neither a member nor a group coordinator is found in the neighbor list of the node, the node forwards a G-JREQ command frame to a parent of the node.

30. The system of claim 23, wherein each node provides multicast group membership updates using the neighbor list by exchanging messages with the member nodes of each multicast group said node participates in.

31. The system of claim 23, wherein each node leaves a multicast group by broadcasting a message to its local nodes, such that each local node in the multicast group receiving the message updates its neighbor list to reflect that the local node can no longer reach remaining nodes in said multicast group through the leaving member node.

32. The system of claim 31, wherein said messages are exchanged when the network is in operation after initialization, each node broadcasting a message locally when the node becomes a member, or router, of a multicast group, as well as when leaving a multicast group.

33. A computer program product for multicast routing in a wireless mesh network, comprising a non-transitory computer usable medium including a computer readable program comprising program instructions, wherein the computer readable program when executed on a computer causes the computer to: maintain a multicast logical tree having a structure establishing parent-child connectivity relationships between wireless station nodes, wherein each node has access to local connectivity information for its local nodes; enable a wireless station to join a multicast group in the network, and each group member or router propagating group membership information and the local connectivity information via message transmission among its local nodes in the logical tree; and enable the multicast group members to perform multicast packet forwarding communications among the multicast group members, wherein multicast packets comprise group request and group reply command frames, wherein a forwarded group reply command frame is not required to follow a route of a group request command frame, wherein when a multicast group member or group coordinator is in a neighbor list of an intermediate node in relation to a node, then receiving a group reply packet without waiting for the group request packet to reach the multicast group member or the group coordinator.

34. The computer program product of claim 33, further including program instructions for:
one or more other wireless station nodes joining the multicast group and becoming members,
wherein multicast packet forwarding communications among the multicast group members is based on the tree structure.

35. The computer program product of claim 34, wherein the logical tree spans all nodes in the network providing basic forwarding of multicast control packets, wherein group request command frames comprise Group Join REQuest (G-JREQ) command frames, and group reply command frames comprise Group Join REPly (G-JREP) command frames, wherein each control packet is routed to appropriate nodes by checking the control packet destination address.

36. The computer program product of claim 35 further including program instructions for maintaining the neighbor list for each node, the neighbor list containing multicast related information for member nodes of each multicast groups said node participates in.

37. The computer program product of claim 36 further including program instructions for providing multicast group membership updates using the neighbor list by exchanging messages among the member nodes of each multicast group.

38. The computer program product of claim 36 further including program instructions for:
a member node leaving a multicast group by broadcasting a message to its local nodes; and
each local node in the multicast group receiving the message updating its neighbor list to reflect that the local node can no longer reach remaining nodes in said multicast group through the leaving member node.

39. The computer program product of claim 38 further including program instructions for exchanging said messages when the network is in operation after initialization, each node broadcasting a message locally when the node becomes a member, or router, of a multicast group, as well as when leaving a multicast group.

\* \* \* \* \*